(12) United States Patent
Iyer et al.

(10) Patent No.: US 8,504,866 B2
(45) Date of Patent: Aug. 6, 2013

(54) SUPPLYING HYSTERESIS EFFECT MITIGATED CLOCK SIGNALS BASED ON SILICON-TEST CHARACTERIZED PARAMETER

(75) Inventors: Arun Iyer, Karnataka (IN); Bhawna Tomar, Karnataka (IN); Animesh Jain, Bangalore (IN); Krishna Sethupathy Leela, Bangalore (IN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 434 days.

(21) Appl. No.: 12/847,369

(22) Filed: Jul. 30, 2010

(65) Prior Publication Data
US 2012/0030500 A1 Feb. 2, 2012

(51) Int. Cl.
*G06F 1/04* (2006.01)

(52) U.S. Cl.
USPC .......................................... 713/503; 713/500

(58) Field of Classification Search
None
See application file for complete search history.

(56) References Cited

U.S. PATENT DOCUMENTS

| | | | | |
|---|---|---|---|---|
| 5,369,311 | A * | 11/1994 | Wang et al. | 327/292 |
| 2011/0271134 | A1 * | 11/2011 | Hofmann | 713/500 |

* cited by examiner

*Primary Examiner* — Kenneth Kim
(74) *Attorney, Agent, or Firm* — Terrile, Cannatti, Chambers & Holland, LLP; Stephen A. Terrile

(57) ABSTRACT

Embodiments of systems and methods are described for reducing the effects of hysteresis in the operation of data processing circuitry. In this embodiment of the invention, adaptive control circuitry is used to reduce the effects of hysteresis. The embodiment disclosed herein provides significant reduction in the effects of hysteresis and, therefore, a significant reduction in the amount of guard band needed to compensate for hysteresis effects in SOI processes and thereby improving the performance/power characteristics of the circuit.

14 Claims, 3 Drawing Sheets

SUPPLYING HYSTERESIS EFFECT MITIGATED CLOCK SIGNALS BASED ON SILICON-TEST CHARACTERIZED PARAMETER

BACKGROUND OF THE INVENTION

1. Field of the Invention

The present invention relates in general to the field of data processing circuitry and, more specifically, to systems and methods for improving data processing circuit performance by reducing the effects of hysteresis in Silicon on Insulator (SOI) technology.

2. Description of the Related Art

Source Synchronous Bus (SSB) timing is a technique typically used to distribute high speed data from one point of the chip to another. In source synchronous (SS) channels, one or multiple data streams are bundled together with a clock signal that are all generated in a transmitter circuit and travel through long distances on-chip to a receiver circuit that uses the same clock to capture the sent data. SS methodology is an extremely robust distribution technique, as it allows cancellation of all forms of systematic variations that affect both the data and clock lines.

In SOI, over the usual sources of process variation like die-to-die or random/systematic mismatch On-Chip Variation (OCV), there is an additional source of variation called hysteresis. Hysteresis is due to a memory effect where the previous switching activity influences the threshold voltage of the SOI transistor in a subsequent switching activity. The threshold voltage typically stabilizes after a large number of switching events.

Therefore, in the design of SS channels in an SOI process, a significant amount of additional guard-band is added to cover for hysteresis-related effects that lead to increased latency of point-to-point communication, and increased active and leakage power consumption. Likewise, in the design of a CMOS implementation in an SOI process, a significant amount of additional guard-band is added to cover for hysteresis-related effects that can lead to increased latency for wake-up period during chip initialization, point-to-point communication, increased active and leakage-power consumption.

In view of the foregoing, it is apparent that there is a need for improved systems and methods for reducing the effects of hysteresis in data processing circuits.

BRIEF DESCRIPTION OF THE DRAWINGS

The present invention may be understood, and its numerous objects, features and advantages obtained, when the following detailed description is considered in conjunction with the following drawings, in which.

Figure 1A:
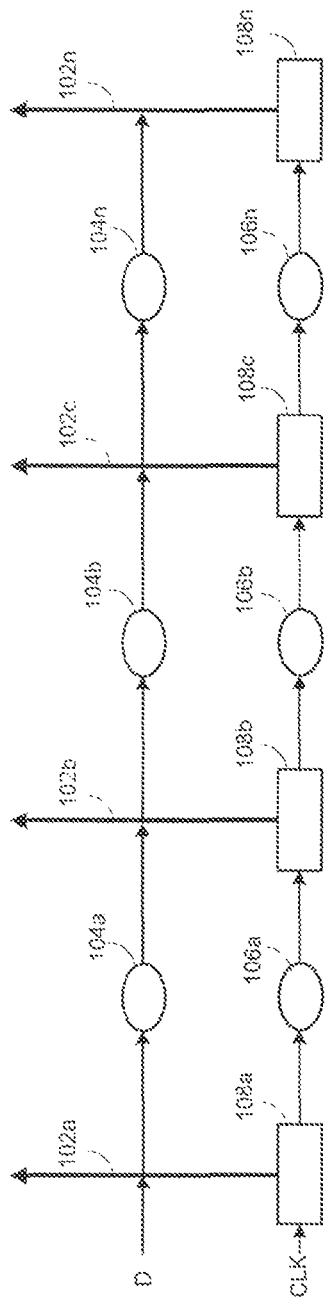
FIG. 1a is a schematic illustration of logic components of a prior art SSB channel.

Where considered appropriate, reference numerals have been repeated among the drawings to represent corresponding or analogous elements.

SUMMARY OF EMBODIMENTS OF THE INVENTION

Embodiments of the invention comprise systems and methods for improving data processing circuit performance by reducing the effects of hysteresis in SOI technology. Various embodiments of the invention are especially useful in source synchronous circuits; however, the techniques described herein are also applicable to other forms of data processing circuits.

In one embodiment, the invention relates to a system for reducing the effects of hysteresis in a system for propagating data in a datapath. In this embodiment, the system comprises: a plurality of clocked data processing elements operable to receive input data and to generate output data therefrom; a clock generator operable to generate clock signals to propagate data through said data processing elements; and hysteresis management circuitry operable to mitigate hysteresis effects in said clock signals.

In another embodiment, the invention relates to a method for propagating data in a datapath. In this embodiment, the method comprises: using a plurality of clocked data processing elements to receive input data and to generate output data therefrom; using a clock generator to generate clock signals to propagate data through said data processing elements; and using hysteresis management circuitry to mitigate hysteresis effects in said clock signals.

In various embodiments of the system and method disclosed herein, the hysteresis management circuitry is operable to adaptively control hysteresis effect based on a predetermined parameter. In some embodiments, the predetermined parameter comprises a silicon-test characterized parameter.

In some embodiments of the system and method, the hysteresis management circuitry comprises a counter operable to track elapsed time as a function of the clock sourced by said counter. One of the parameters comprises the number of cycles taken by an uninitialized clock path circuit to attain a typical duty cycle. In other embodiments, one of the parameters may comprise the number of cycles of dead time after which the duty cycle of the clock path falls below a predetermined or silicon-characterized threshold. In some embodiments, one of the parameters may comprise the number of cycles of dead time after which the duty cycle of the clock path falls below a predetermined silicon-characterized threshold.

DETAILED DESCRIPTION

Embodiments of circuitry are described for systems and methods for reducing the effects of hysteresis in the operation of data processing circuitry. In various embodiments of the invention, adaptive control circuitry is used to reduce the effects of hysteresis.

Illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified drawings in order to avoid limiting or obscuring the present invention. Such descriptions and representations are used by those skilled in the art to describe and convey the substance of their work to others skilled in the art. Various illustrative embodiments of the present invention will now be described in detail with reference to the figures.

FIG. 1a is a schematic illustration of the logic components of a prior art SSB channel 100a. In this channel, each of the vertical arrows 102a-n represent a flip-flop, the oval boxes 104a-n and 106a-n represent the buffer delay on the path from one flip-flop to the next, and the rectangular boxes 108a-n represent retimer cells placed to mimic the flip-flop's latency. The retimer cells 108a-n can be assumed to be combinational cells.

The timing constraints for the SSB channel are given below:

SETUP:

$$(Tdp-Tcp)+(SU+Tclk\text{-}q\text{-}Tretimer)<=T-U$$

HOLD:

$$(Tdp-(Tcp-Tp))+(Tclk\text{-}q\text{-}Tretimer)>=HLD+U$$

Where,

Tp represents the pulse width of the clock signal.
U represents the timing uncertainty present on the path.
Tcp, Tdp represent the clock and data path delays for a path.
SU, HLD represent the Setup and Hold times of the flip-flops.
Tclk-q is clock to Q output data delay
Tretimer is the Retimer Latency For the widely used bulk process, the sources of U, as shown in the schematic in FIG. 1a, are random and mis-match (MM) and across die variations. In SOI, in addition to these two components, U includes a significant component of an effect called hysteresis. Hysteresis in SOI implies the variation in the threshold voltage and hence delays of a transistor with change of input signal activity. Therefore, when a transistor is initially in a COLD (uninitialized) state, the first input transition causes the worst delay, and the second transition causes the best delay. These variations (best+worst) can be as large as 10% (=5+5). Since it is systematic, the effect of this behavior worsens with long/deep path circuits like the retimer path in the SSB channel. As a result, the first and second switch scenario causes the pulse-width of the clock signal flowing through the retimer channel to be reduced significantly with the depth of the channel:

$$Tp=T/2-i^*(Tbest-Tworst);$$

Where:

Tp represents the pulse width reduced due to Hysteresis
T/2 represents the ideal Pulse-width (50% clock duty cycle)
Tbest, Tworst represent the best and worst switching delays on the retimer path
i represents the ith ff stage of the SSB channel.

This also causes a reduction in the effective cycle time as seen by a flip-flop:

$$Th=Tp+T/2<2^*T/2=T$$

Where:

Th represents the hysteresis affected cycle time
Tp represents hysteresis affected pulse width, as shown above.

As seen in the timing constraints derived above, the pulse width plays an important role in the value of hold and SU margins on the paths. Therefore, a reduction in effective pulse width causes the SSB channel to either be prone to variation on silicon or leads to an over-design causing increased channel latency and hence degraded performance.

The uncertainty introduced by hysteresis has a dependency related to the activity of the input signal. Once a circuit starts switching, its threshold voltage gradually begins to approach the typical value and stabilizes. This process of stabilization can take as long as 1000 cycles in some processes. However, once stabilized, the circuit retains its characteristics, and if later the circuit does not switch, it can gradually fall back to the initial state. The fall-back process depends on the gradual discharge of the steady charge from the bulk of the transistor and is of the same order as the stabilization time.

In the case where the circuit comes out of the reset state, state machines present in the transmitter and receiver guarantee that valid data is propagated only after the SSB channel has warmed up. However, once a valid data stream starts flowing through the channel, any latency (to allow warm up) affects the system's performance. This is especially problematic for circuits with power management (like clock gating, etc.).

Figure 1B:
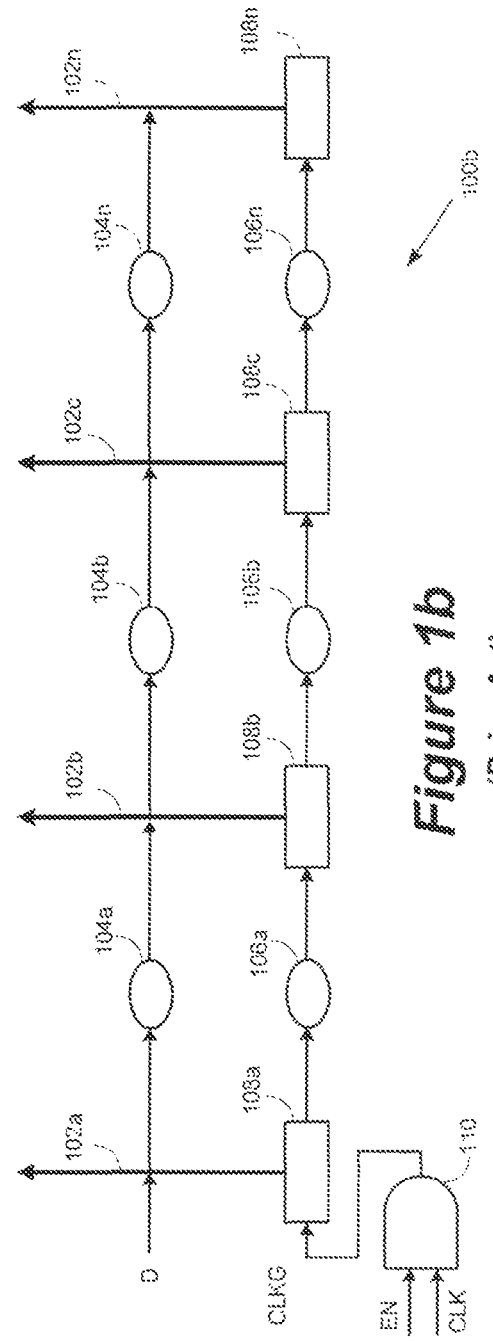
FIG. 1b is a schematic illustration of logic components of the prior art SSB channel shown in FIG. 1a with clock gating circuitry.

As shown in FIG. 1b, a clock gating circuit 110 can be used to gate the SSB clock signal CLK with the enable signal EN to generate the gated clock CLKG. As discussed hereinabove, during the case when the EN is inactive, the CLKG feeding the SSB channel is not switching. In most low power designs, the EN signal is inactive for a significant number of cycles, leading to increased hysteresis effects on the clock path of the SSB channel (due to transistors gradually discharging to their initial states). This is one of the main reasons for applying the excessively pessimistic hysteresis margins on the SSB channel paths.

Figure 2:
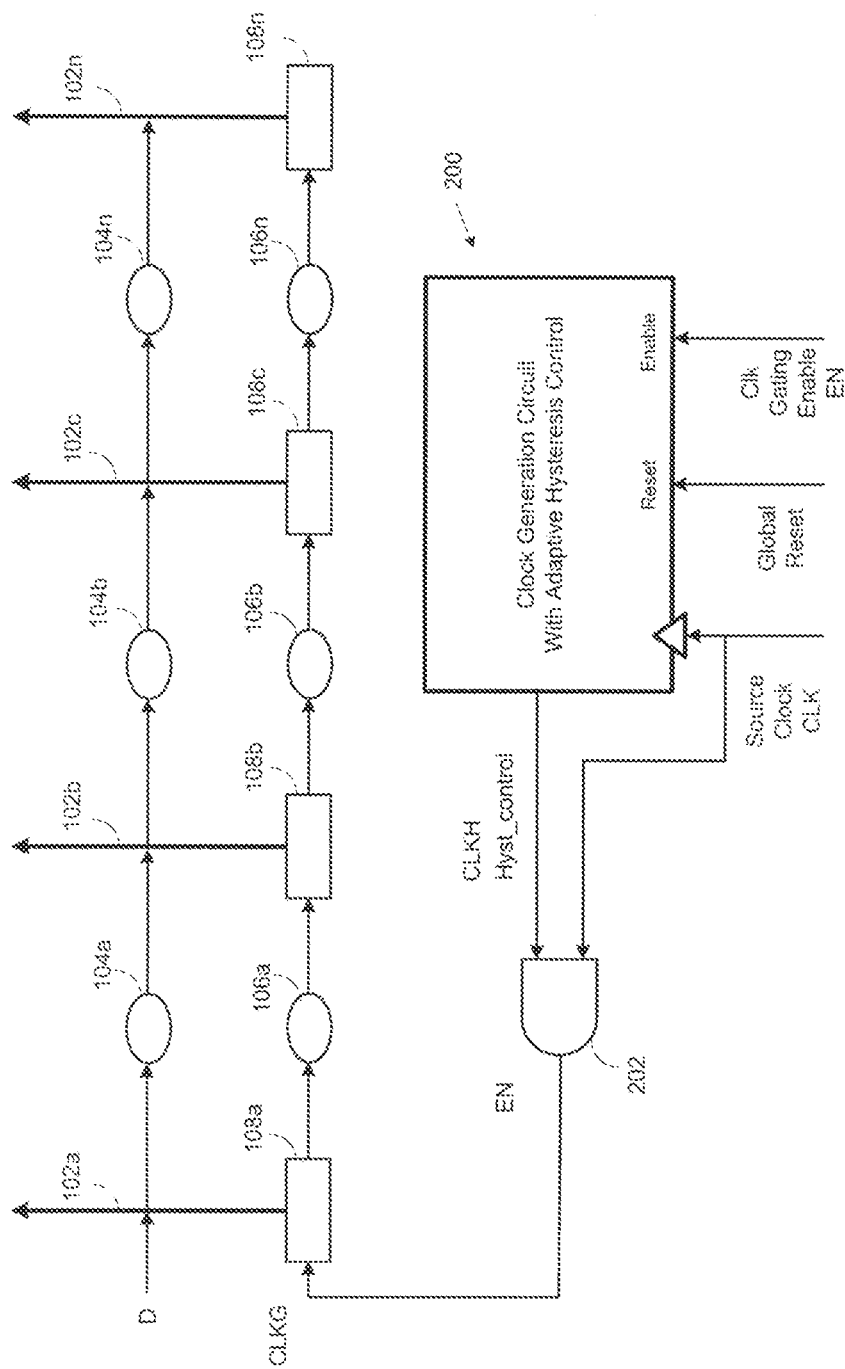
FIG. 2 is a schematic illustration of an SSB channel comprising a clock generated using an adaptive hysteresis control circuit.

Embodiments of the present invention solve the problems discussed above by providing a clock generation circuit with adaptive hysteresis control 200, as shown in FIG. 2. The circuit shown in FIG. 2 comprises an SSB channel whose clock signal CLKH is generated using the adaptive hysteresis control circuit 200. The hysteresis control circuit comprises a counter that is used to keep track of the time elapsed as a function of the clock sourced by the counter. The control circuitry requires some pre-characterized/hard-coded parameters for its operation. One of the parameters needed is the number of cycles 'N' taken by a COLD (un-initialized) clock path circuit to attain the typical duty cycle. Another significant parameter is the number of cycles 'D' of dead-time after which the duty cycle of the clock path falls below a pre-determined threshold.

Using simulations or silicon characterization, it is possible to determine the hysteresis characteristics of a long inverter chain (or similar simple circuit) that mimics the clock path of the SSB channel. A clock signal is fed to this characterization circuit and duty cycle variation of the circuit is observed over a period of multiple cycles. The critical observation is the number of cycles 'N' taken by the circuit to reach the typical duty cycle value when starting from a COLD state. This value N=~1000 cycles for 32 nm SOI.

In another simulation, it is possible to continuously vary the dead-time (EN is inactive) after the clock path has stabilized (after N cycles) and restart the clock after the dead-time and observe the duty-cycle characteristics. In the case where the duty cycle immediately after the dead-time falls below the pre-determined threshold, the value of 'D' can be determined.

Figure 3:
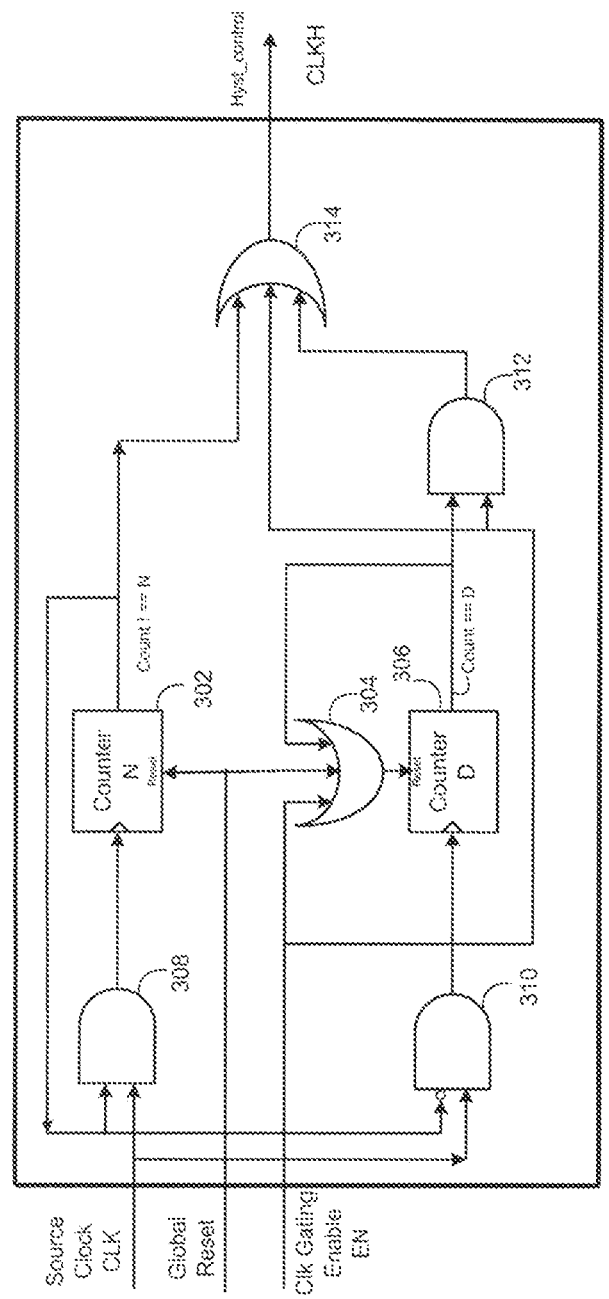
FIG. 3 is a schematic illustration of the functional components of a clock circuit for implementing adaptive hysteresis control.

FIG. 3 is a schematic representation of the functional components of the clock generation circuit with adaptive hysteresis control shown in FIG. 2. A source clock CLK signal is provided as an input to AND gates 308 and 310. A global reset signal is provided as an input to counter N circuit 302 and to OR gate 304. A clock gating enable signal EN is provided as an input to OR gates 304 and to AND gate 312 and OR gate 314. The output of OR gate 304 provides a reset signal to counter D 306. The output of AND gates 308 and 310 are provided as inputs to counter N circuit 302 and counter D circuit 306.

When the global reset signal is high/active, i.e., in reset state, the circuit is inactive. This resets all the counters in the circuit. When the global reset signal is inactive, the circuit is activated. All the counters are ready to operate based on the controls received by them.

Initially, after resuming from the reset state, the counter N 302, that can count up to N cycles gets activated, and as long as the count is not equal to N, the output of counter N circuit 302 is high. This output activates the HYST_CONTROL signal that allows the source clock signal CLK to flow through and warm the SSB channel clock path for N cycles.

At the end of N cycles, the output of counter N 302 goes low and gates the clock going to this counter. This control also triggers/activates the counter D 306. The counter D 306 is a circuit basically used to count if there has been any activity on the CLK gating enable signal EN for D cycles. If EN is activated during any time before D cycles, then the output of counter D 306 is reset and its output goes low. Obviously, the enable also activates the clock to the SSB channel for data to be transferred across the channel.

In the case of EN not having any activity for D cycles, then the output of counter D 306 goes high and allows a single clock cycle to be propagated to the SSB channel path. This dummy activity is used to allow resettling of the bulk voltage of the transistors on the clock path. The counter D 306 output, when high, also resets the counter D 306 at the next cycle, so the process can start all over again.

The adaptive control circuitry shown in FIG. 3 provides tight control on the bulk voltages of the SSB channel's clock path transistors and, hence, the duty cycle degradation of the clock signal is mitigated. Hysteresis is also a strong function of voltage and process corner. In low power designs, voltage scaling is typically used to reduce power. The information about the power states (and hence voltage) is normally stored in the FSM controlling the chip power management. Similarly, using on-die ring oscillators (or similar process indicator circuits), it is possible to identify the process corner (by using a pre-characterized frequency/other-parameters to corner lookup table).

With this available information, the control circuitry shown earlier can be slightly modified to have multiple values of (N, D) for various voltages and process corners. Based on this information gathered, appropriate values of (N, D) can be selected to mitigate hysteresis for the operating conditions.

Although the described exemplary embodiments disclosed herein are directed to various examples of a system and method for managing hysteresis in data processing circuits, the present invention is not necessarily limited to the example embodiments. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for propagating data in a datapath, comprising:
a plurality of clocked data processing elements operable to receive input data and to generate output data therefrom;
a clock generator operable to generate clock signals to propagate data through said data processing elements; and
hysteresis management circuitry operable to mitigate hysteresis effects in said clock signals; and wherein
said hysteresis management circuitry is operable to adaptively control hysteresis effects in said clock signals based on a predetermined parameter; and,
wherein said predetermined parameter comprises a silicon-test characterized parameter.

2. The system of claim 1, wherein said hysteresis management circuitry comprises a counter operable to track elapsed time as a function of the clock sourced by said counter.

3. The system of claim 1, wherein one of said parameters comprises the number of cycles taken by an uninitialized clock path circuit to attain a typical duty cycle.

4. The system of claim 1, wherein one of said parameters comprises the number of cycles of dead time after which the duty cycle of the clock path falls below a predetermined threshold.

5. The system of claim 1, wherein one of said parameters comprises the number of cycles of dead time after which the duty cycle of the clock path falls below a silicon-characterized threshold.

6. A method for propagating data in a datapath, comprising:
using a plurality of clocked data processing elements to receive input data and to generate output data therefrom;
using a clock generator to generate clock signals to propagate data through said data processing elements; and
using hysteresis management circuitry to mitigate hysteresis effects in said clock signals; and wherein
said hysteresis management circuitry is operable to adaptively control hysteresis effects in said clock signals based on a predetermined parameter; and,
wherein said predetermined parameter comprises a silicon-test characterized parameter.

7. The method of claim 6, wherein said hysteresis management circuitry comprises a counter operable to track elapsed time as a function of the clock sourced by said counter.

8. The method of claim 6, wherein one of said predetermined parameters comprises the number of cycles taken by an uninitialized clock path circuit to attain an operational duty cycle.

9. The method of claim 6, wherein one of said parameters comprises the number of cycles of dead time after which the duty cycle of the clock path falls below a predetermined or silicon-characterized threshold.

10. A system for mitigating hysteresis in a data processing circuit, comprising:
- monitoring circuitry operable to monitor a source clock signal provided to a plurality of individual data processing elements in said data processing circuit; and
- hysteresis control circuitry operable to adaptively generate a plurality of clocked data processing elements operable to receive input data and to generate output data therefrom;
- a clock generator operable to generate clock signals to propagate data through said data processing elements; and
- hysteresis management circuitry operable to mitigate hysteresis effects in said clock signals; and wherein
- said hysteresis management circuitry is operable to adaptively control hysteresis effects in said clock signals based on a predetermined parameter; and, wherein said predetermined parameter comprises a silicon-test characterized parameter.

11. The system of claim 10, wherein said hysteresis management circuitry comprises a counter operable to track elapsed time as a function of the clock sourced by said counter.

12. The system of claim 10, wherein one of said parameters comprises the number of cycles taken by an uninitialized clock path circuit to attain a typical duty cycle.

13. The system of claim 10, wherein one of said parameters comprises the number of cycles of dead time after which the duty cycle of the clock path falls below a predetermined threshold.

14. The system of claim 10, wherein one of said parameters comprises the number of cycles of dead time after which the duty cycle of the clock path falls below a silicon-characterized threshold.

* * * * *